UNITED STATES PATENT OFFICE 2,279,497

ASYMMETRICAL CONDENSATION PRODUCTS AND PROCESS OF PREPARING SAME

Richard Sallmann, Bottmingen, and Otto Albrecht, Neue Welt, near Basel, Switzerland, assignors to Society of Chemical Industry in Basle, Basel, Switzerland No Drawing. Application August 1, 1939, Serial No. 287,851. In Switzerland August 12, 1938

17 Claims. (Cl. 260—295)

According to this invention new asymmetrical condensation products are made by causing formaldehyde to act in either order of succession and in presence of a catalyst on one molecular proportion each of two different amides in which a nitrogen atom bound to a carbonyl group is connected with at least one hydrogen atom, the two different amides being selected in such a manner that at least one amide contains more than six carbon atoms.

It is advantageous first to react one of the aforesaid amide-like starting materials with formaldehyde to form a methylol compound, and then to proceed in a second stage to the production of the asymmetrical condensation products. It is however also possible to use the mixture of the two different amides with the formaldehyde for the reaction.

The amide-like reaction components may contain groups lending solubility in water, or substituents convertible into such groups. This conversion is preferably performed after the production of the asymmetrical condensation product.

Amide-like parent materials are for example amides and urethanes, which may contain any desired substituent, but must contain at least one free hydrogen atom at the nitrogen atom bound to a carbonyl group. There are suitable, for example, aliphatic, aromatic, aliphatic-aromatic, cycloaliphatic or heterocyclic amides, such as the amides of acetic acid, propionic acid, acrylic acid, butyric acid, caprylic acid, capric acid, undecylic acid, lauric acid, myristic acid, palmitic acid, stearic acid, oleic acid, cerotic acid; further the amides of benzoic acid, naphthoic acid, hexahydrobenzoic acid, the amides of resin acids and naphthenic acids; furthermore the amides of chloracetic acid, chloromethyl-benzoic acid, chloropropionic acid, glycollic acid, or salicylic acid, as well as the corresponding N-substitution products, which still contain at least one free hydrogen atom linked to the nitrogen atom, such as N-methyl- or N-ethyl-lauric acid amide. There are also suitable as amides urea and melamine and substitution products thereof, such as monomethylurea.

Amide-like compounds which contain a

>NH-group in amide- or imide-like combination as a member of a ring, are for example, diketo-piperazine or phthalimide. As urethanes there are suitable for example those which are substituted at the oxygen atom by a methyl-, ethyl-, octyl-, dodecyl-, benzyl- or cyclohexyl residue.

The formaldehyde may be used in the form of an aqueous solution or in the form of its polymeric modifications, for example, para-formaldehyde.

The above-mentioned methylol compounds which may be used in the process, are either known, such as methylol-urea, N:N-dimethyl-methylol-urea, methylol-chloracetamide, stearic acid methylolamide, salicylic acid methylolamide, methylolphthalamide and the like, or can be prepared by analogous methods, for example by causing the amide- or imide-like compound dissolved in a solvent such as water, alcohol, acetone, acetic acid, benzene or pyridine or mixtures thereof to react with formaldehyde at ordinary or moderately raised temperature, for example at 50–100° C. if necessary in presence of basic or acid catalysts, such as trimethylamine, potash, barium hydroxide, hydrogen chloride, sulfuric acid or salts such as zinc chloride.

As groups lending solubility in water the amide- or imide-like compounds or their methylol derivatives may contain sulfonic acid groups, thiosulfuric acid ester groups, sulfuric acid ester groups or carboxylic acid groups in free or neutralized form, and further quaternary ammonium groups. For example there may be used the methylol compounds of sulfo-acetamide or of carboxylic acid amides which contain a quaternary ammonium group, for example the addition products of tertiary amines, such as trimethylamine, pyridine, methylpiperidine, hexamethylenetetramine with the N-methylol derivatives of the corresponding halogen carboxylic acid amides. Hydroxyl groups, for example in the form of glycerine or poly-glycerine residues, and further polyglycol residues may be present in the aforesaid parent materials as groups which impart or enhance solubility in water.

The reaction between the formaldehyde and the two different amide-like compounds, at least one of which contains a residue having more than 6 carbon atoms, may be conducted by mixing the components at room temperature or at raised temperature, preferably in presence of a solvent, such as water, methanol, ethyl alcohol, dioxane, glacial acetic acid, acetone, benzene, toluene or pyridine, in the presence of a catalyst, particularly a catalyst of acid nature, such as strong mineral acids, for instance hydrogen chloride or sulfuric acid. The process may be conducted in a similar manner when the asymmetrical condensation products are made by using the above-mentioned preliminary conversion products with formaldehyde.

A reactive substituent, which if desired, may be present in one of the condensation components, for example a halogen atom, may be converted after the condensation according to known methods into a group imparting or enhancing solubility in water. Thus, for example, tertiary amines can be added at the halogen atom with the formation of quaternary ammonium salts, for example in presence of solvents, such as petroleum ether. This addition frequently takes place by allowing the reactants to stand at room temperature. Furthermore, the halogen atoms may be converted with sodium thiosulfate, for example in presence of solvents, such as water, methanol, ethyl alcohol, acetone or mixtures thereof. Hydroxy-groups, which if desired may be present in the condensation product, may be converted into sulfuric acid ester groups, for example by means of the addition product of sulfur trioxide with pyridine, or by means of sulfuric acid, chlorosulfonic acid, sulfuric acid containing sulfur trioxide, if necessary in presence of solvents, such as halogen-hydrocarbons, diethyl ether, dichlorodiethyl ether, or in the presence of other substances which favor the reaction, such as glacial acetic acid or acetic anhydride.

The asymmetrical condensation products obtained according to the present process are N:N'-diacylated methylene diamines in which the acyl radicals are different from one another and in which at least one acyl radical contains at least six carbon atoms. These products are liquid to solid substances which are decomposed on prolonged boiling with hydrochloric acid, for instance concentrated hydrochloric acid, compounds being formed which are insoluble in water or at least very sparingly soluble in water. The N:N'-diacylated methylenediamines obtainable from primary acid amides correspond for example to the formula

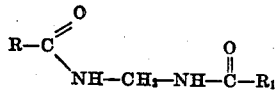

wherein R stands for an alkyl radical containing at least 11 carbon atoms and R₁ stands for an alkyl radical of low molecular weight which contains for example at least one water-solubilizing group. The N:N'-diacylated methylenediamines obtainable from substituted acetamides correspond for example to the formula

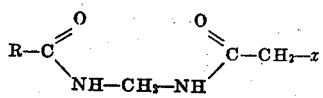

wherein R has the significance indicated in the preceding sentence and x stands for a water-solubilizing group. Those products are particularly valuable in which at least one acyl radical contains at least 12 carbon atoms.

The products obtained according to the invention may be used inter alia as assistants, for example in the textile, leather and paper industries. The products which are insoluble in water, according to the choice of the parent materials, are valuable intermediate products for the production of textile assistants or dyestuffs. In many cases the water-insoluble products may also be used as waxes. Owing to their capillary-active properties the water-soluble products which contain an aliphatic or cycloaliphatic residue of high molecular weight, are valuable wetting-, washing-, emulsifying-, foaming-, equalizing- and softening-agents. By a suitable choice of the parent materials water-soluble salts may be produced which possess the property of being decomposed by heat or by treatment with saponifying agents, so that insoluble bodies separate. If this decomposition is performed on a substratum, for example on textiles, these insoluble bodies separate in a firmly adherent form. According to its nature it can impart to the fiber certain valuable properties. Prominent among these is the capacity for imparting a water-proof or water-repellent character which is fast to washing, if desired combined with a particular softness and fullness, which latter may be enhanced by the addition of separate filling agents. It is also possible strongly to reduce the hygroscopicity and to increase the insulating properties towards heat and electricity. As further properties which can be imparted to the fiber there may be mentioned resistance to creasing, displacement of the fibers of the fabric, diminution in lustre, increase in water-proof character, the prevention of shrinking of fabrics and in the case of wool the prevention of felting. By local application there may also be produced calender, matt and damask effects, and color effects by locally varying the capacity of the fibers for absorbing dyestuffs. By applying the process to dyed textiles the properties of the dyeings, such as fastness to light, fastness to rubbing, fastness to washing and fastness to water, can be considerably improved. These various effects may be combined with one another.

The products of the invention may be used alone or in admixture with other substances, such as salts, particularly salts of weak acids, for example sodium acetate and also together with solvents, soaps, saponaceous substances, protective colloids, dressing agents, loading agents, softening agents or matting agents and the like.

The following examples illustrate the invention, the parts being by weight unless otherwise stated, and the relationship of parts by weight to parts by volume being the same as that of the kilogram to the liter.

*Example 1*

18 parts of lauric acid methylolamide, 11.1 parts of chloracetic acid amide and 60 parts by volume of absolute alcohol are stirred for a short time at 50–55° C. 30 parts by volume of alcoholic hydrochloric acid are added, whereby dissolution occurs immediately and the temperature is kept at 50–55° C. for about 30 minutes. Colorless crystals then gradually separate. The crystals which separate from the mother liquor after cooling are dried under reduced pressure at 60–65° C. In order to effect the addition of pyridine 9 parts of the resulting condensation product which has been completely freed from adherent hydrochloric acid in vacuo, are stirred with 45 parts by volume of dry pyridine for 15 hours at 50–55° C., the whole is allowed to cool, the crystals which have separated are removed from the mother liquor, washed with a little diethyl ether and the adhering solvent is allowed to evaporate at room temperature. The almost colorless quaternary pyridinium salt so obtained which probably has the formula

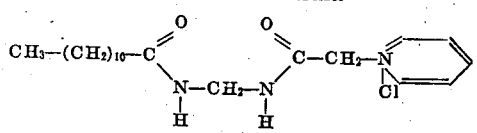

dissolves in water to give a solution which strongly foams upon shaking and is particularly suitable for softening viscose artificial silk.

The undecyl acid methylolamide or naphthenic acid methylolamides, particularly of high molecular weight, may be used in similar manner for the reaction with the chloracetic acid amide.

Instead of with pyridine the above described condensation product from lauric acid methylolamide and chloracetamide may also be reacted with sodium thiosulfate, for instance in methanol of 90 per cent strength at about 50° C.

*Example 2*

10 parts of stearic acid methylolamide, 4.5 parts of chloracetic acid amide and 30 parts by volume of absolute alcohol are stirred for a short time at 50–55° C. and 15 parts by volume of alcoholic hydrochloric acid are added, which causes the reaction mixture to become almost completely clear. The crystals which have separated after stirring at 50–55° C. for 1½ hours are separated from the still warm mother liquor, washed with diethyl ether and dried at 50–55° C. In order to effect the addition of pyridine 3 parts by weight of the condensation product so obtained are stirred with 15 parts by volume of dry pyridine for about 18 hours at 50–55° C. and the pyridine is then distilled under reduced pressure. The quaternary pyridinium salt so obtained, which is an almost colorless powder, dissolves in warm water to an opalescent solution which foams on shaking, and it finds application as a softening agent for artificial silk.

*Example 3*

6.2 parts of stearic acid methylolamide are dissolved in 50 parts by volume of glacial acetic acid. 4 parts of the addition product of chloracetamide and trimethylamine are then added. The solution is heated over-night to 90–100° C., cooled, filtered from any constituents which have separated, and evaporated in vacuo. The condensation product is obtained in the form of a soft mass which dissolves in water to give a clear solution, and aqueous solutions of which have strong capillary active properties. The product which corresponds very probably to the formula

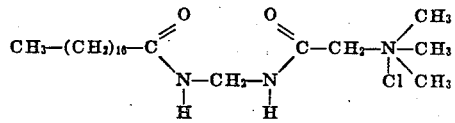

has pronounced softening properties with respect to cotton and artificial silk.

*Example 4*

5.6 parts of stearic acid amide are dissolved in 60 parts by volume of glacial acetic acid. After the addition of 5 parts of the addition product of chloracetic acid methylolamide with trimethylamine the solution is heated for 40 hours at 90–100° C. After cooling, filtration and evaporation in vacuo a product is obtained which has properties similar to those of the product of Example 3.

Instead of the above mentioned addition product of trimethylamine with chloracetic acid methylolamide there may also be used the addition product of trimethylamine with α-bromopropionic acid. Trimethylamine may also be replaced by pyridine.

*Example 5*

5.6 parts of stearic acid amide are dissolved hot in 50 parts by volume of glacial acetic acid. At 90–100° C. 5 parts of the sodium salt of methylol acetamide sulfonic acid are added in finely powdered condition whilst stirring. After heating for 40 hours at 95–100° C. the solution is decanted from a small amount of undissolved material and the glacial acetic acid is distilled in vacuo. The new sulfonic acid, which is obtained as the sodium salt and which represents very probably a salt of the sulfonic acid of the formula

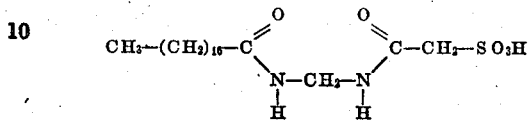

may be recrystallized from alcohol in order to purify it further.

The new product dissolves to a clear solution in warm water with the formation of a solution which foams strongly and possesses pronounced capillary active properties. The aqueous solution will not form a precipitate either with dilute acids or dilute alkalis.

A product with similar properties is obtained by using oleic acid amide instead of stearic acid amide.

*Example 6*

1.3 parts of urea are dissolved in 15 parts by volume of concentrated sulfuric acid. 1.6 parts of stearic acid methylolamide are added at ordinary temperature while stirring and, after complete dissolution, the whole is allowed to stand for 12 hours. It is then poured on to ice, filtered, washed with water and dried. After recrystallization from dioxane the new product melts at 194–201° C.

*Example 7*

7 parts of stearic acid amide are dissolved in 50 parts by volume of concentrated sulfuric acid. 1.7 parts of dimethylolurea are added while stirring and allowed to stand at ordinary temperature overnight. After introducing the mixture into ice water the condensation product is obtained in the form of a waxy mass having a melting point of 200–205° C.

*Example 8*

3.1 parts of stearic acid methylolamide are dissolved together with 1.2 parts of benzamide in 20 parts by volume of dioxane. After the addition of 0.5 part by volume of concentrated hydrochloric acid the solution is allowed to stand at room temperature for 3 days. The greater part of the condensation product separates out. After filtering and twice crystallizing from dioxane the product melts at 131–134° C.

*Example 9*

6 parts of N-methyl-stearic acid amide are dissolved in 50 parts of glacial acetic acid. 5 parts of sodium methylolacetamide sulfonate are added while stirring and the whole is heated for 70 hours at 95–100° C. After distilling the solvent the residue is dissolved in alcohol and precipitated with ether. The product is obtained in the form of a white water-soluble powder.

What we claim is:

1. Process for the manufacture of asymmetrical condensation products, which comprises reacting the N-hydroxymethyl derivative of an amide in which the nitrogen atom is bound to a carbonyl group in the presence of an acid, with another amide in which the nitrogen atom bound to the carbonyl group is connected with at least one hydrogen atom, one of the two different amides containing at least 12 carbon atoms.

2. Process for the manufacture of asymmetrical condensation products, which comprises reacting the N-hydroxymethyl derivative of an amide in which the nitrogen atom is bound to a carbonyl group in the presence of an acid, with another amide in which the nitrogen atom bound to the carbonyl group is connected with at least one hydrogen atom, one of the two different amides being a fatty acid amide containing at least 12 carbon atoms.

3. Process for the manufacture of asymmetrical condensation products, which comprises reacting a fatty acid amide containing at least 12 carbon atoms in which the nitrogen atom of the amide group is connected with at least one hydrogen atom in the presence of an acid, with another carboxylic acid amide which contains at least one water-solubilizing group and in which the nitrogen atom of the amide group is connected with at least one hydrogen atom, one of the two different carboxylic acid amides being used in the form of its N-hydroxymethyl derivative.

4. Process for the manufacture of asymmetrical condensation products, which comprises reacting a fatty acid amide containing at least 12 carbon atoms in which the nitrogen atom of the amide group is connected with at least one hydrogen atom in the presence of an acid, with an acetic acid amide which contains at least one water-solubilizing group and in which the nitrogen atom of the amide group is connected with at least one hydrogen atom, one of the two different carboxylic acid amides being used in the form of its N-hydroxymethyl derivative.

5. Process for the manufacture of an asymmetrical condensation product, which comprises reacting stearic acid amide in the presence of an acid with the product of addition of trimethylamine to methylol-chloracetic acid amide.

6. Process for the manufacture of an asymmetrical condensation product, which comprises reacting stearic acid amide in the presence of an acid with the N-hydroxymethyl derivative of the acetamide sulfonic acid.

7. Process for the manufacture of asymmetrical condensation products, which comprises reacting a fatty acid amide containing at least 12 carbon atoms in which the nitrogen atom of the amide group is connected with at least one hydrogen atom in the presence of an acid, with another carboxylic acid amide which contains at least one halogen atom and in which the nitrogen atom of the amide group is connected with at least one hydrogen atom, one of the two different carboxylic acid amides being used in the form of its N-hydroxymethyl derivative, and then replacing the halogen atom by a water-solubilizing group.

8. Process for the manufacture of asymmetrical condensation products, which comprises reacting a fatty acid amide containing at least 12 carbon atoms in which the nitrogen atom of the amide group is connected with at least one hydrogen atom in the presence of an acid, with another carboxylic acid amide which contains at least one halogen atom and in which the nitrogen atom of the amide group is connected with at least one hydrogen atom, one of the two different carboxylic acid amides being used in the form of its N-hydroxymethyl derivative, and then replacing the halogen atom by a quaternary ammonium group.

9. Process for the manufacture of an asymetrical condensation product, which comprises reacting lauric acid methylolamide in the presence of an acid with monochloracetic amide, and then treating the condensation product with pyridine to form the quaternary pyridinium chloride.

10. The N:N'-diacylated methylenediamines, in which the two acyl radicals differ from each other, one of them containing at least 12 carbon atoms, which products are liquid to solid substances which are decomposed by prolonged boiling with hydrochloric acid, water-insoluble compounds being formed.

11. The N:N'-diacylated methylenediamines, in which the two acyl radicals differ from each other, one of them being the acyl radical of a fatty acid containing at least 12 carbon atoms, which products are liquid to solid substances which are decomposed by prolonged boiling with hydrochloric acid, water-insoluble compounds being formed.

12. The N:N'-diacylated methylenediamines, in which the two acyl radicals differ from each other, one of them being the acyl radical of a fatty acid containing at least 12 carbon atoms, and the other containing at least one water-solubilizing group, which products are water-soluble liquid to solid substances which are decomposed by prolonged boiling with hydrochloric acid, water-insoluble compounds being formed.

13. The N:N'-diacylated methylenediamines of the formula

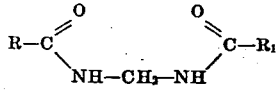

wherein R stands for an alkyl radical containing at least 11 carbon atoms, and $R_1$ stands for a lower alkyl radical containing at least one water-solubilizing group, which products are water-soluble liquid to solid substances which are decomposed by prolonged boiling with hydrochloric acid, water-insoluble compounds being formed.

14. The N:N'-diacylated methylenediamines of the formula

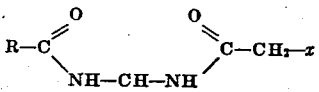

wherein R stands for an alkyl radical containing at least 11 carbon atoms, and $x$ stands for a water-solubilizing group, which products are water-soluble liquid to solid substances which are decomposed by prolonged boiling with hydrochloric acid, water-insoluble compounds being formed.

15. The diacylated methylenediamine of the formula

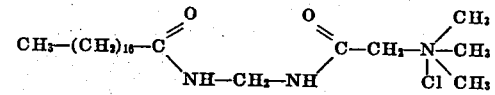

which product is a water-soluble soft mass the aqueous solutions of which have a strong wetting capacity and are decomposed by prolonged boiling with hydrochloric acid, water-insoluble compounds being formed.

16. The salts of the diacylated methylene diamine of the formula

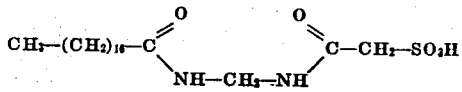

which salts are water-soluble solid substances the aqueous solutions of which have a strong wetting capacity and are decomposed by prolonged boiling with hydrochloric acid, water-insoluble compounds being formed.

17. The diacylated methylenediamine of the formula

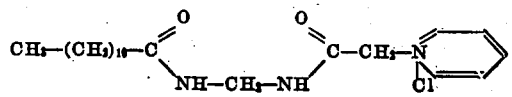

which product is a water-soluble solid substance the aqueous solutions of which have a strong wetting capacity and are decomposed by prolonged boiling with hydrochloric, water-insoluble compounds being formed.

RICHARD SALLMANN.
OTTO ALBRECHT.